United States Patent
De Vries et al.

(10) Patent No.: US 11,019,693 B2
(45) Date of Patent: May 25, 2021

(54) LIGHTING-SYSTEM AND A LIGHTING-SYSTEM CONTROL METHOD

(71) Applicant: SIGNIFY HOLDING B.V., Eindhoven (NL)

(72) Inventors: Judith Hendrika Maria De Vries, Budel-Schoot (NL); Tom Verhoven, Eindhoven (NL); Alexandre Georgievich Sinitsyn, Veldhoven (NL); Ralf Gertruda Hubertus Voncken, Eindhoven (NL); Dominika Lekse, Eindhoven (NL); Bert Van Willigen, Neuenen (NL); Remco Theodorus Johannes Muijs, Meteren (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/346,798

(22) PCT Filed: Oct. 19, 2017

(86) PCT No.: PCT/EP2017/076732
§ 371 (c)(1),
(2) Date: May 1, 2019

(87) PCT Pub. No.: WO2018/082929
PCT Pub. Date: May 11, 2018

(65) Prior Publication Data
US 2019/0281681 A1 Sep. 12, 2019

(30) Foreign Application Priority Data

Nov. 1, 2016 (EP) .................................... 16196690

(51) Int. Cl.
*H05B 45/22* (2020.01)
*H05B 47/11* (2020.01)
(Continued)

(52) U.S. Cl.
CPC ............. *H05B 45/22* (2020.01); *H05B 47/10* (2020.01); *H05B 47/11* (2020.01); *H05B 47/12* (2020.01); *H05B 47/13* (2020.01)

(58) Field of Classification Search
CPC ................ H05B 45/22; H05B 33/0869; H05B 47/10–13
See application file for complete search history.

(56) References Cited

U.S. PATENT DOCUMENTS 7,064,664 B2* 6/2006 Lerg ...................... G08B 15/00
340/540
9,060,393 B1* 6/2015 Chung ................. G08B 13/196
(Continued)

FOREIGN PATENT DOCUMENTS

CN 103698007 A 4/2014
WO 2014147524 A1 9/2014
(Continued)

*Primary Examiner* — Alexander H Taningco
*Assistant Examiner* — Pedro C Fernandez
(74) *Attorney, Agent, or Firm* — Meenakshy Chakravorty

(57) ABSTRACT

A lighting-system (100) for illuminating an environment, comprising a lighting module (111, 112, 113), a sensor (141, 142, 143) and a lighting-system control device (130). The lighting module (111, 112, 113) comprises a light source (121) for emitting light, and a programmable controller (122) configured to control an operation of the light source. The sensor is arranged to obtain sensing data from an area illuminated by the light source (121). The lighting-system control device (130) comprises a processor circuit (133) configured to apply an activity classifier to the sensing data to obtain an activity classification for the area, to determine lighting control data to change a light spectrum of the light source based on the activity classification, and to transmit the lighting the lighting control data.

18 Claims, 12 Drawing Sheets

(51) Int. Cl.
*H05B 47/10* (2020.01)
*H05B 47/12* (2020.01)
*H05B 47/13* (2020.01)

(56) References Cited

U.S. PATENT DOCUMENTS

| | | | |
|---|---|---|---|
| 9,137,878 B2* | 9/2015 | Thompson | H05B 47/105 |
| 9,215,781 B2* | 12/2015 | Marman | G06T 7/248 |
| 2011/0141472 A1 | 6/2011 | Meijer et al. | |
| 2012/0123637 A1* | 5/2012 | Funayama | G01J 3/021 |
| | | | 701/36 |
| 2014/0198216 A1 | 7/2014 | Zhai et al. | |
| 2015/0296594 A1* | 10/2015 | Blum | H05B 47/11 |
| | | | 315/158 |
| 2015/0354789 A1 | 12/2015 | Paolini | |
| 2016/0035078 A1 | 2/2016 | Lin et al. | |
| 2016/0150622 A1* | 5/2016 | Flinsenberg | H05B 47/19 |
| | | | 315/297 |

FOREIGN PATENT DOCUMENTS

| | | |
|---|---|---|
| WO | 2015140131 A1 | 9/2015 |
| WO | 2016074463 A1 | 5/2016 |

\* cited by examiner

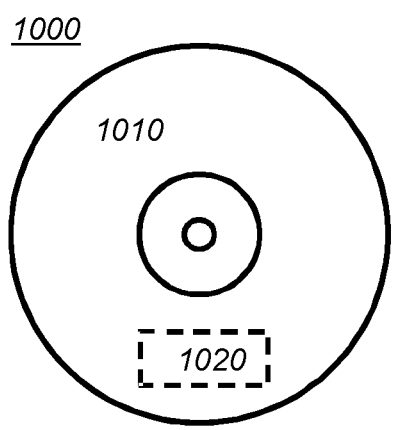
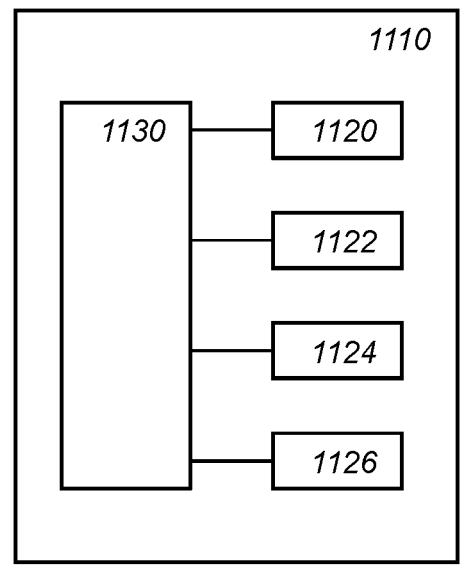
Fig. 7a
Fig. 7b

LIGHTING-SYSTEM AND A LIGHTING-SYSTEM CONTROL METHOD

CROSS-REFERENCE TO PRIOR APPLICATIONS

This application is the U.S. National Phase application under 35 U.S.C. § 371 of International Application No. PCT/EP2017/076732, filed on Oct. 19, 2017, which claims the benefit of European Patent Application No. 16196690.8, filed on Nov. 1, 2016. These applications are hereby incorporated by reference herein.

FIELD OF THE INVENTION

The invention relates to a lighting-system, a lighting-system control device, a lighting-system control method, and a computer readable medium.

BACKGROUND

There is an interest to enhance the quality and performance of urban services. Sometimes these are referred to as 'smart cities'. For example, technologies have been developed that detect unsocial or otherwise undesirable behavior of citizens in order to create a safer city. Automatic detection of unwanted behavior is desirable as a lot of such incidents remain undetected due to scarcity of law enforcement resources. The undetected unwanted behavior often leads to escalation and serious damages to people and property. In general, such undetected incidents lead to an increase of perceived safety. Street patrolling, e.g., policing, is not efficient if they have to respond to all detected violations, since it costs a lot of man hours to control all these issues.

For example, U.S. Pat. No. 7,064,664 "Graffiti detection system and method of using the same", discloses a known system for detecting a graffiti-making act such as the spray of a spray paint can. The system includes one or more sensors adapted to sense the graffiti-making act and transmit a signal representative of the graffiti-making act to a base unit. The base unit is adapted to process the signal and to determine whether the signal represents a graffiti-making act. If graffiti is detected, a communication device initiates an alarm indicating that the graffiti-making act took place.

US2012/123637 A1 discloses a mover spectrum measuring apparatus, which is able to discriminate an object being measured more reliably by relieving the influences of an environmental light on photographic data by a spectrum sensor mounted on a mover such as a vehicle. A spectrum sensor capable of measuring wavelength information and optical intensity information is mounted on a vehicle, so that an object being measured around the vehicle is discriminated on the basis of the spectrum data relating to the observation light detected by the spectrum sensor. The mover spectrum measuring apparatus comprises an illumination device for making variable the featuring quantity of at least either the wavelength range of the observation light or the optical intensity of each wavelength, and controls the featuring quantity varying mode by the illumination device through an illumination controller on the basis of the control value according to an environmental element.

US2015/354789 A1 discloses a system comprising a light valve exposed to incident light from an external light source, the light valve independently modulating a plurality of wavelength bands of the incident light transmitted through the light valve and into an environment that the system illuminates; and a control system connected to operate the light valve to control a spectral distribution of light transmitted through the light valve.

WO2015/140131 A1 discloses a lighting system for illuminating an article comprising a lighting device arranged to emit light towards the article, wherein a spectrum of the emitted light is controllable. A controller is configured to control the lighting device responsive to detection of presence of a person within a detection zone associated with the article and to control the lighting device to emit light having a first spectrum in response to absence of a person within the detection zone, and control the lighting device to emit light having a second spectrum in response to presence of a person within the detection zone. The light having the first spectrum presents, in at least one wavelength interval, a lower power than the light having the second spectrum, and the light having the first spectrum and the light having the second spectrum provide a corresponding level of illumination of said article.

Automatic detection of unwanted behavior, such as graffiti, may help to scare persons away, and to make public areas safer and make law enforcement teams work more efficiently. Unfortunately, the known system has various drawbacks. Although the known system can initiate a sonic alarm, this in itself does not need to deter the graffiti spraying. Even whilst an alarm is playing the graffiti spraying may continue. Moreover, the sonic detection may have false alarms.

SUMMARY OF THE INVENTION

It would be advantageous to have an improved system for deterring unwanted behaviors. A lighting-system for illuminating an environment is provided. The lighting system comprises one or more lighting modules and a lighting-system control device. The lighting module comprises:
  a light source for emitting light, and
  a programmable controller configured to control an operation of the light source, a spectrum of the light source being controllable by the programmable controller, and
  a sensor arranged to obtain sensing data from an area illuminated by the light source.

The lighting-system control device comprises a processor circuit configured to
  apply an activity classifier to the sensing data to obtain an activity classification for an activity in the area,
  determine lighting control data to change the light spectrum of the light source based on the activity classification, and
  transmit the lighting control data to the lighting module to program said lighting module according to the lighting control data,
  wherein the processor circuit is configured to set the lighting control data to a default lighting control data and to a further lighting control data different from the default lighting control data upon obtaining activity classification corresponding to the further lighting control data and,
  wherein the changed light spectrum reduces contrast of an object important to the activity.

Because the lighting module has a programmable controller, the spectrum of the lighting module can be changed in response to lighting control data received from the lighting-system control device. The lighting-system control device receives sensing data from the sensor and applies the activity classifier to the sensing data. Image recognition algorithms can detect in the sensing data the unwanted activities thus classifying it. When such an unwanted activity is found, lighting control data can be determined that is specific for the found activity so as to deter it.

For example, in an embodiment the sensor comprises a camera, and the sensing data comprises image data, the activity classifier being applied to one or more images obtained from the camera. The changed light spectrum may reduce the contrast of an object in the image, reducing the visibility of that object for the person that performs the activity. For example, if the unwanted activity is taking drugs, especially drugs taken by injection in a vein using a needle, the spectrum may be changed to a high-blue content spectrum. This discourages taking of drugs, as veins become less easily visible. For example, if the unwanted activity is spraying graffiti, the spectrum may be changed to reduce contrast in the graffiti. For example, if the graffiti is currently sprayed using a green color spray, the spectrum may change to a high-green content spectrum to reduce contrast in this color range. Hence, the visibility of the graffiti being made by the person that performs that activity is reduced. As a result, the artist cannot properly see what he is doing, which in turn deters the activity. Note that most of the time the lighting system uses normal lighting, e.g., as appropriate for the time of day. Only when the unwanted behavior is found is the spectrum changed accordingly.

If changing the spectrum does not help sufficiently, the lighting system can take further measures, e.g., sending a signal to officials, such as the police, using light to mark the location of the activity, increasing light intensity to make finding the perpetrators easier, etc.

The lighting system is an electronic system comprising electronic devices.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a lighting-system, FIG. 1b schematically shows an example of an embodiment of a lighting-system control device, FIG. 1c schematically shows an example of an embodiment of a light source, FIG. 2 schematically shows an example of an embodiment of a lighting-system, FIG. 3a schematically shows an example of an embodiment of a lighting-system, FIG. 3b schematically shows an example of an embodiment of a lighting-system control device, FIG. 3c schematically shows an example of an embodiment of a lighting-system, FIG. 4a schematically shows an example of an image comprising graffiti.

LIST OF REFERENCE NUMERALS IN FIGS. 1a-4c

Figure 1A:
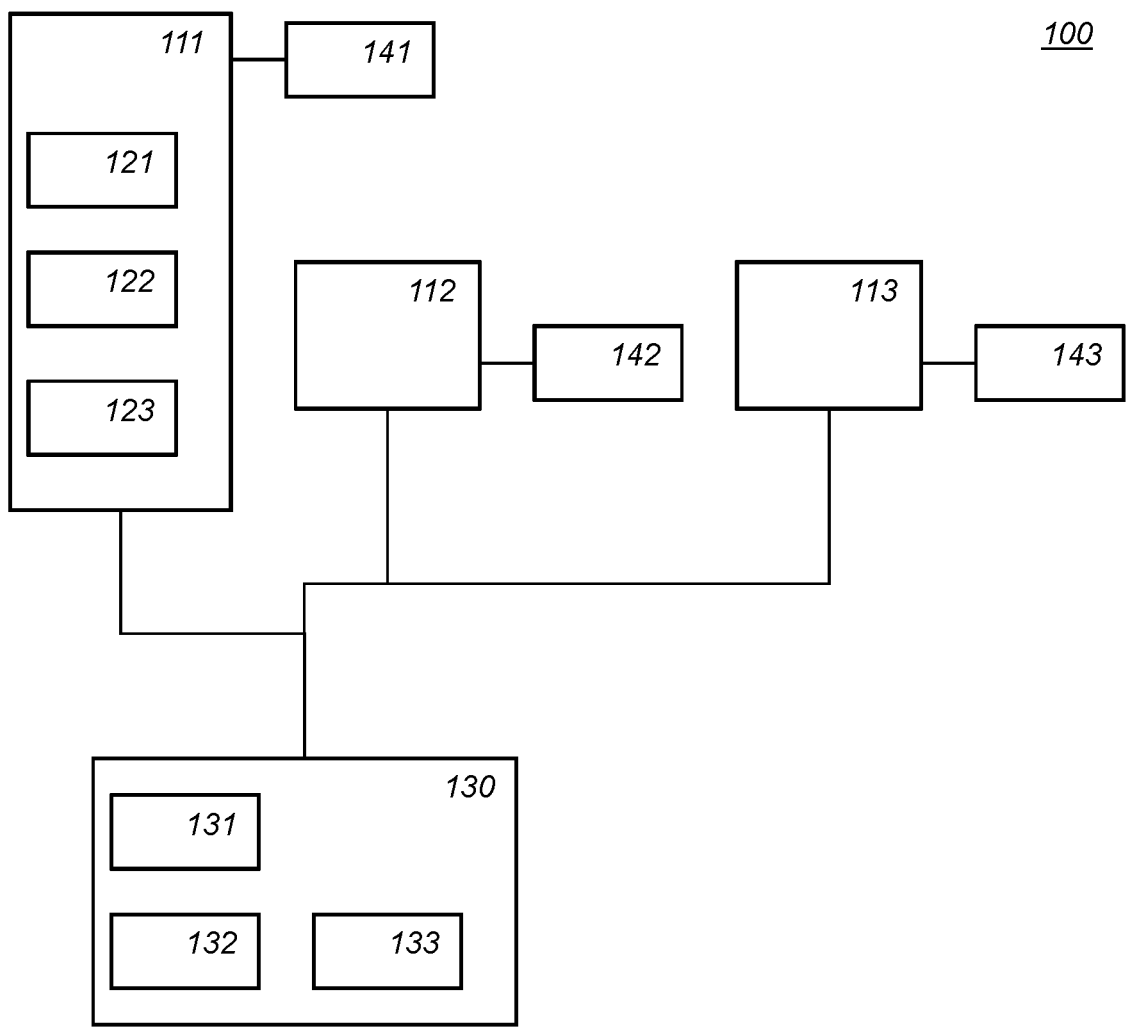

100-103 a lighting-system
111-113 a lighting module
121 a light source
122 a programmable controller
123 a network interface
130, 150, 151 a lighting-system control device
131 a receiver
132 a network interface
133 a processor circuit
145 a further sensor
152 a network communication unit
153 an activity classifier
154 a lighting control data database
155 a lighting control data determiner
156 a preliminary activity filter
161 a white led
162 a red led
163 a blue led
164 a green led
401 an image
412 a graffiti
413 a graffiti with reduced contrast
403 an image
414 a region of interest
415 an unrelated region

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

The known system is based on sonic detection; in the art other technology is known for detecting activities. For example, image recognition systems may be adapted to recognize many types of activities. For example, US 20160035078, "Image assessment using deep convolutional neural networks", may be adapted to recognize activities such as graffiti spraying.

FIG. 1a schematically shows an example of an embodiment of a lighting system 100.

Lighting system 100 comprises lighting modules 111, 112 and 113. FIG. 1a illustrates an embodiment of a lighting module for lighting module 111 in more detail. The other lighting modulus may be of the same or a similar design. Lighting module 111 comprises a light source 121 for emitting light, a programmable controller 122 configured to control an operation of the light source 121 and a network interface 123 configured to allow lighting module 111 to communicate via a digital network. The programmable controller 122 controls a light spectrum of the light source 121 in response to received lighting control data. Shown in FIG. 1a, there are three lighting modules 111, 112, 113. In an embodiment, there may be two lighting modules, or more than three, e.g., more than 10, 100, or 1000, etc.

The lighting modules are configured to illuminate an environment, e.g., an indoor space, for example an indoor parking lot, or an outdoor space, for example a street, or a public space, such as a park. The lighting modules 111, 112 and 113 may be of any type suitable for the specific implementation. Lighting modules 111, 112 and 113 may for example be of the same type.

For example, in an embodiment, lighting modules 111, 112 and 113 may comprise outdoor lighting modules. A lighting module for an outdoor application may in particular be a lighting pole, as further described in an embodiment below. Further examples of outdoor lighting modules include street lamps, e.g., luminaires, road signaling lamps, parking lot illumination modules, building illumination modules, and the like. In an embodiment, lighting modules 111, 112 and 113 may comprise indoor lighting modules. Examples of indoor lighting modules include luminaires, tube lights, and the like.

The light source 121 may be of any type for which the light spectrum can be changed through a programmable controller and is suitable for the specific application. Spectrum controllable LED lights are suitable for the invention, but an embodiment may also contain for example, fluorescent light bulbs, tungsten-halogen light, or the like. In an embodiment, the light source is a LED source arranged to have a controllable light spectrum. In an embodiment, the light source 121 is of a type in which the spectrum is changed by changing the color temperature.

Lighting system 100 comprises a sensor 141 arranged to obtain sensing data from an area illuminated by light source 121. Shown are three sensors 141, 142 and 143, associated with the respective lighting modules 111, 112 and 113 to obtain sensing data from an area illuminated by a respective light source of each lighting module 111, 112 or 113. Cameras, e.g. motion or still cameras are a suitable choice for the sensors. The cameras may be arranged for visible light. The lighting system may additionally comprise 'dumb' lighting modules (not shown in FIG. 1a), e.g., without a sensor, or without a programmable controller, etc.

Sensors 141, 142 and 143 may be separate from the respective lighting modules 111, 112 and 113, or integrated therein. In an embodiment, e.g. as described below, one or more of lighting modules 111, 112 or 113 may comprise respective light sensors 141, 142 or 143. The sensors may also form a separate sensor network that communicates with lighting-system controller 130 over the computer network independent from the lighting modules.

The lighting modules are configured to cooperate with a lighting-system control device 130. Network controller 123 is arranged to communicate with lighting-system control device 130 over a computer network. The computer network may, e.g., be an Ethernet type network. The computer network may be wireless, wired or a combination thereof. For example, network controller 123 may be a wireless network controller.

Lighting system 100 comprises a lighting-system control device 130. Lighting-system control device 130 comprises a receiver 131, a network interface 132 and a processor circuit 133. In FIG. 1a, lighting-system controller 130 is arranged as a back-end, but lighting-system controller 130 may also be combined with the lighting module.

Receiver 131 is configured to receive the sensing data of at least one sensor associated with one or more of the lighting modules 111, 112 or 113, e.g., through network interface 132. Lighting-system control device 130 may be communicatively coupled to lighting module 111 via network interface 132. Lighting-system control device 130 may also be communicatively coupled to lighting modules 112 and 113 via network interface 132.

Processor circuit 133 is configured to apply an activity classifier to the sensing data to obtain an activity classification for the area. For example, the activity classifier may be configured with a set of activities and trained to recognize the presence or absence of these activities in the sensing data. For example, the activity classifier may produce likelihood that the activity is represented in the sensing data. If the likelihood is above an activity threshold, the activity is regarded as recognized. Note that the activity threshold may be different for different activities. For example, more serious activities, say violent crime, may have a lower threshold, than non-violent crime, as the risk of false positives is may be more accepted in the first case.

The activity classier may be a software model trained on sensing data for which it is known that the activity is present. Suitable training material may be obtained from the same or similar sensors installed in similar locations as the lighting system will be used. For example, a human expert may classify the training sensing data after which activity classifier is configured to approximate the expert classification.

Processor circuit 133 is configured to determine lighting control data to change the light spectrum of the light source based on the activity classification and transmit the lighting control data to lighting module 111, 112 or 113 to program said lighting module 111, 112 or 113 according to the lighting control data. The determining of the lighting control data may use additional inputs, e.g., the current time, the ambient light level in the area surrounding the lighting module, etc. The latter may be obtained from a light sensor.

The inventors have realized that lighting system 100 may be used to detect and discourage non-allowed acts in public spaces, like acts of vandalism, unusual behavior of persons in public outdoor or indoor spaces. Such non-allowed act may be any of, for example, graffiti spraying, drug abuse, urination in public space or the like. Lighting-system 100 may be used to deter such non-allowed act in any manner described herein below. Discouraging an activity may be done by changing the spectrum of lighting modules that are nearby the activity. The changed spectrum may reduce contrast of parts of the activity, thus discouraging it. The lighting modules may also be used to alert officials to the location of the activity.

In an embodiment, the activity classifier is configured to classify at least the act of spraying graffiti. In an embodiment, the activity classifier is configured to classify at least the act of injecting drugs. In this embodiment the lighting control data is arranged to increase the blue-content in the spectrum of the light source.

Sensors 141, 142 and 143 may be of any type suitable for the specific implementation. Sensors 141, 142 and 143 may be used to detect specific non-allowed acts in the area illuminated by respective lighting source 111, 112 and 113. For example, sensors 141, 142 and 143 may comprise a camera for e.g. providing images or videos of non-allowed acts in the respective areas, a microphone for detecting sounds related to said acts, a thermal sensor for e.g. detecting presence of persons or fire, or the like. In an embodiment, sensors 141, 142 and 143 may detect a location of the non-allowed act in real-time.

In an embodiment, the location of the non-allowed act is determined by a location of sensors 141, 142 and 143. The location of sensors 141, 142 and 143 may be known by the installer of the system, thus sensors 141, 142 and 143 may detect a non-allowed act in proximity of sensors 141, 142 and 143.

In an embodiment, sensors 141, 142 and 143 may be arranged in a network of sensors for tracking the non-allowed act. For example, a vandal spraying graffiti on a wall may move from an area illuminated by light source 121 to another area illuminated by another light source, for example a light source of lighting module 112 or 113. In this case the light spectrum of light source of lighting modules 111, 112 and 113 may be changed in real time according to movements of the vandal.

In an embodiment, the activity classifier may be based on an image classifier. The image classifier may be specifically trained with training data. Training data may comprise a limited set of behavior.

In an embodiment, training data may be obtained from sensors 141, 142 or 143. For example, if sensors 141, 142, 143 are cameras, training data may comprise images or video of unusual behavior of persons perpetrating non-allowed acts in public spaces. In an embodiment, the limited set of behavior may be determined by a heuristic function, a trained neural network, a support vector machine (SVM) taking for example features from trained neural networks.

The inventors found that an efficient way to train an activity classifier is to start off from a deep neural network pre-trained as an image or video classifier. The image classifier may then be retrained to recognize the activities of interest. For example, the pre-trained may be embedded in larger neural network, e.g., by adding layers, or by replacing one or more final layers of the pre-trained neural network. In an embodiment, the number of recognized activities may be relatively limited, e.g., less ten. One or more of the classified activities may not be unwanted. For example, the activities may include, e.g., normal activity, no activity, etc. An advantage of using a deep neural network is that comparatively high-level concepts may also be recognized, e.g., 'violence', 'drugs', 'graffiti', etc.

To explain further, lighting system 100 may be used in the context of deterring a specific non-allowed act. The specific non-allowed act may be, as described earlier, spraying graffiti in an area where it is not allowed, injecting drugs in public areas or also breaking glasses of a window's shop or a parked car, or even urinating in public areas, etc. Sensor 141 may for example be arranged to obtain sensing data according to the specific non-allowed behavior.

For example, such sensing data may comprise a sound of spraying but also the sound of shaking graffiti cans in the case of spraying graffiti. Such sensing data may comprise a sound of breaking glasses in the case of breaking glasses or a sound of urine flow in case of urination in public areas.

Alternatively, such sensing data may comprise video or images of movements and behaviors typical of persons spraying graffiti or injecting drugs in case the abuse of drugs in public areas is detected.

Processor circuit 133 is configured to apply an activity classifier to said sensing data to obtain an activity classification for the area of interest. In the examples above, said activity classification may comprise the act of spraying graffiti or breaking glasses or injecting drugs in public areas or urinating in public areas. For example, the result of the activity classifier may be a vector giving a likelihood, e.g., a probability, of the recognized activities. For example, if the set of recognized activities is {normal, graffiti, drugs}, then an output of the activity classifier may be (0.005, 0.98, 0.015) in a situation wherein the activity classifier is fairly certain that graffiti is being applied, e.g., sprayed. In case, a graffiti detection threshold is said to, say, 0.98, the output may be simplified to graffiti activity detected. Note that the activity classifier may not be sufficiently certain of any activity; in this case, the lighting system controller may revert to a default lighting. The same default lighting may be used for normal activity.

Processor circuit 133 is configured to determine lighting control data to change the light spectrum of the light source associated to the area of interest based on the particular activity classification. The inventors realized that many types of activities may disrupted by lighting of a particular spectrum, e.g., a lighting spectrum that reduces contrast of objects important to the activity. In an embodiment, e.g., as further described below, the lighting control data may change the spectrum of the light source of lighting module such to reduce contrast of an object in an image. In an embodiment further described below, the sensing data comprise image data and the processor circuit may be configured to determine a color from the image data. The lighting control data is determined to change the light spectrum to the color in the image data.

Processor circuit 133 is configured to transmit the lighting control data to the lighting module to program said lighting module according to the lighting control data. The lighting control data may be suitable for the particular activity classification. For example, lighting control data may be represented in an embodiment as an electronic signal sent to controller 122. The electronic signal may be a digital signal. For example, the electronic signal may comprise instructions for controller 122 that cause controller 122 to control the lighting module as desired. For example, the signal may represent a lighting spectrum. For example, the signal may represent the strength with which some of the LEDs in a lighting module should be driven. A signal of the latter type can control the intensity of the light as well as its spectrum.

In some embodiments, the color, the intensity, the brightness or the shape of the light source may be changed. The light spectrum is changed in any manner suitable to discourage the persons from perpetrating the non-allowed act.

For example, a person who is urinating in a public space is detected by a suitable sensor of a lighting module. The light spectrum of the light source nearby the person may be changed such that the person is exposed to light, for example fluorescent light or a vivid light color may be used, thereby forcing that person into an uncomfortable situation and discouraging him or other persons in the same area of doing the same. The urinating person may be put in the spotlight by increasing the light intensity of the light source and/or by narrowing the light beam of the light source.

For example, a person who is injecting drug is detected by a suitable sensor of a lighting module. The light spectrum of the light source nearby the person may be changed by increasing the blue-content in the light spectrum, making veins of the person injecting drugs less visible. The person injecting drugs will be surprised by the new light and will not see where he is injecting anymore. Note that this embodiment represents a significant advantage over conventional blue lights installed at places known to be frequented by drug users, say, public toilets. In the conventional blue light, the blue light is always on, thus discouraging drug use but also annoying regular users. However, in an embodiment, the lighting modules may use regular light most of the time, only if drug use or imminent drug use is detected may the spectrum change to a high-blue content spectrum. In this way drug use is only discouraged when this is needed, and not when it is not.

In an embodiment, an alarm signal can be sent, for example an automatic call to the police may be made. The police may see the scene by real-time images or video captured by the sensor, in this example a camera, and judge whether to intervene in loco or not. For example, lighting-system controller 130 may comprise an alarm unit arranged to send an alarm signal, say to the police, or the like. Lighting-system controller 130 may also be arranged to change the light to a color signaling officials to the location of the unwanted activity, e.g., by changing the color to red, etc.

By discouraging persons from perpetrating non-allowed acts, cleaning costs for the municipality or company making use of said lighting system are reduced. Further, public décor as well as general feeling of security of the public is improved.

Figure 1B:
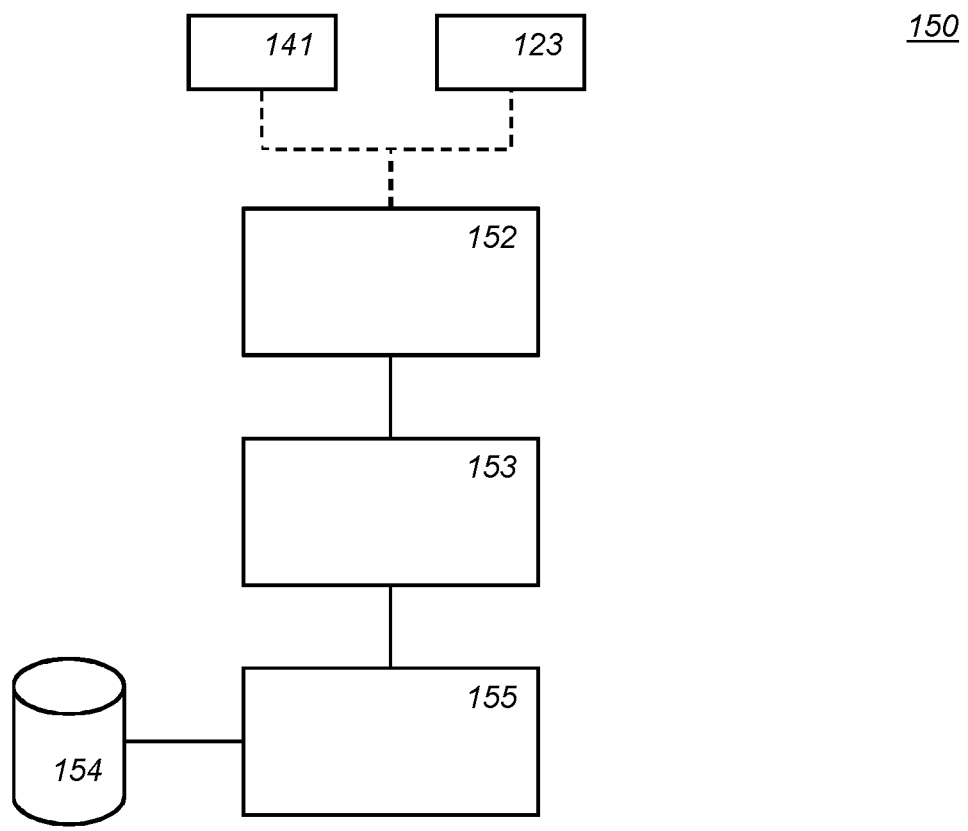

FIG. 1b schematically shows an example of an embodiment of a lighting-system control device 150. The lighting-system control device 150 comprises a network communication unit 152, an activity classifier 153, a lighting control data database 154, and a lighting control data determiner 155. For example, FIG. 1b may be regarded as an architecture of lighting-system controller 130. For example, the units shown in FIG. 1b may be software unit, or sub-circuits, etc.

Network communication unit 152 may be configured to be communicatively coupled to sensor 141 via network interface 123 of the lighting module for example for receiving the sensing data from an area illuminated by the light source of lighting module associated to that sensor. Activity classifier 153 may be configured to apply an activity classifier to the received sensing data.

Lighting control data database 154 may store various activity classifications and associated lighting control data with said activity classifiers. For example, upon detecting an activity classification, the lighting-system control device 150 may retrieve the associated lighting control data from database 154. The retrieved lighting control data may be ready for transmitting to a lighting module, but the lighting control data may also be modified according to a modification rule. The modification rule may be associated with the lighting control data and/or the activity classification as well. For example, the modification rule may change the intensity of the light based on the time of day. In particular, an outdoor lighting control system may modify lighting intensity to zero when outside lighting is sufficiently high, of so high so make the discouraging effect of the changed light spectrum minimal. As a further example, an indoor lighting control system may reduce intensity outside of opening hours, etc.

Lighting control data determiner 155 is configured to determine lighting control data to change the light spectrum of the light source based on the activity classification. For example, lighting control data may change the light temperature. Lighting control data can also control other aspects of the lighting, e.g., the light intensity, area of illumination by changing for example direction, shape of the light source, etc.

Figure 1C:
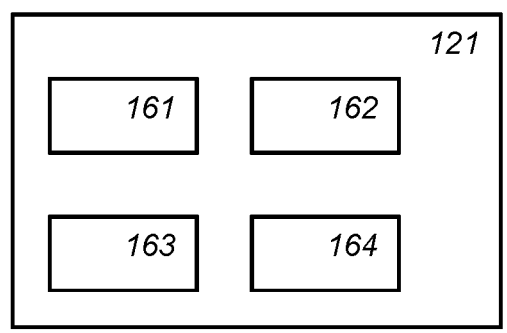

FIG. 1c schematically shows an example of an embodiment of a light source 121.

Light source 121 may be a lighting emitting diode (LED) source. LED source 121 comprises four different color LEDs: a white led 161, a red led 162, a blue led 163 and a green LED 164. LED source 121 is a four-channel lighting element, i.e. having four-channels for driving the LED source 121. Lighting control data for LED source 121 has four channels, one for each LED.

Depending on the activity classifier, one or more of the LEDs 161, 162, 163 or 164 may be selectively switched on or off to change the light spectrum of LED source 121. In an embodiment, color intensity of the LEDs 161, 162, 163 or 164 may be selectively increased or decreased to change the light spectrum of LED source 121.

In an embodiment, each LED 161, 162, 163 or 164 has a tunable spectrum within a wavelength range of the corresponding color. For example, red led 161 may have a tunable spectrum within the wavelength range of red color, e.g., within the range 630-680 nm.

Similarly, blue led 163 may have a tunable spectrum within the wavelength range of blue color, e.g., within the range 440-505 nm. The white LED 161 and the green LED 164 may have, similarly, a tunable spectrum within the wavelength range of the respective white and green color. For example, in this case, the lighting control data may comprise four corresponding channels to control the LEDs through the programmable controller 122.

In an embodiment, the color of the light source 121 may be adapted such that the non-allowed act is better deterred, e.g., color is changed to lower the contrast of the image as in an embodiment described above.

In an embodiment, the lighting control data may have an increased blue-light content depending on the activity classification, for example if activity classification relates to injecting drugs.

For example, in an embodiment the light source of a lighting module comprises multiple lights, e.g., multiple LEDs; the lighting-system controller 130 may store multiple profiles, each profile comprising a setting for each of the multiple lights of the lighting module. For example, a blue-enriched profile may drive a blue led of the lighting module more than a blue-decreased profile, and vice versa for a red and green led.

Figure 2:
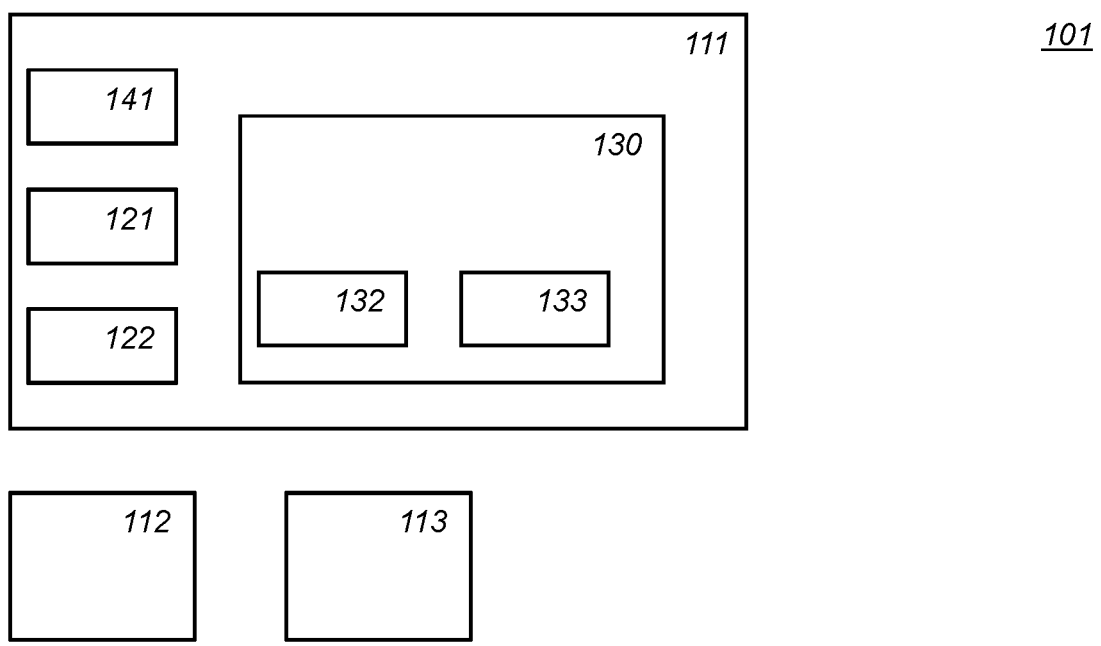

FIG. 2 schematically shows an example of an embodiment of a lighting system 101.

Lighting system 101 differs from lighting system 100 of FIG. 1a in that lighting module 111 comprises sensor 141 and lighting-system control device 130. Similarly, lighting modules 112 and 113 may comprise respective sensors (not shown) and/or respective lighting-system control devices (not shown).

Lighting-system control device 130 may be integrated in lighting module 111 or in any other of lighting modules 112 or 113 or elsewhere.

Lighting-system 101 can be seen as a de-centralized architecture in which each sensor, in this example sensor 141, communicates to a local lighting-system control device 130, for example embedded in lighting module 111. Local lighting-system control device 130 may comprise, as described with reference to FIG. 1b, a lighting control data database from where lighting-system control device 130 may access pre-configured lighting control data specific for a particular activity classification and program locally lighting module 111 therewith.

In an embodiment, lighting modules 111, 112 and 113 are communicatively coupled between each other, for example via respective network interfaces and exchange pre-configured lighting control data stored locally in respective lighting modules 111, 112 and 113.

In an embodiment, as for example for lighting system 100 of FIG. 1a, lighting-system control device 130 may enable central controlling of the lighting system. Thus lighting-system control device 130 may comprise a processor circuit 133 which is capable for example of processing images and videos real-time in order to identify non-allowed acts and/or undesired behavior. Processor circuit 133 may be enabled for recognition of objects and persons in video and/or images. Processor circuit 133 may be enabled for recognition of sounds and/or voices in recorded and/or real-time sound tracks.

For example, lighting system 101 may be configured to detect drug use and installed in a public toilet or the like. Lighting system 101 may use a default lighting in most cases, but change to high-blue content lighting when drug use is suspected. This system does not have overhead incurred from transmitting sensing data over a computer network.

Figure 3A:
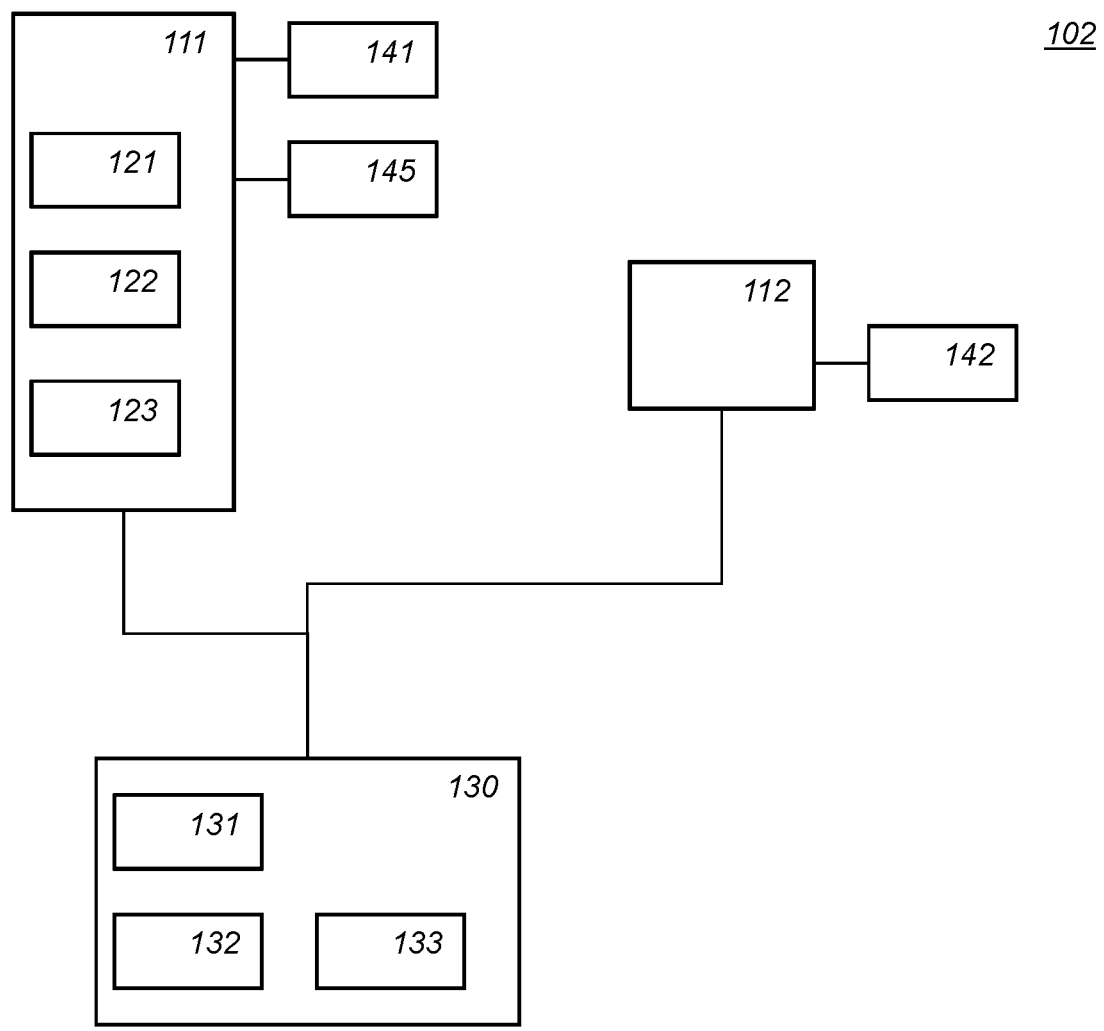

FIG. 3a schematically shows an example of an embodiment of a lighting system 102.

Lighting system 102 differs from lighting system 100 of FIG. 1a in that lighting module 111 is communicatively coupled to a further sensor 145. Further sensor 145 obtains further sensing data. Further sensor 145 may be, just like sensor 141 integrated in lighting module 141. Further sensor 145 may be, just like sensor 141 arranged to obtain sensing data from an area illuminated by light source 121 of lighting module 111. Processor circuit 133 is arranged to apply a preliminary activity filter to the further sensing data to obtain a likelihood that the activity classifier will classify according to a particular activity classification of interest. If the likelihood exceeds a likelihood threshold, then the sensing data is obtained from sensor 141.

In an embodiment, further sensor 145 needs less bandwidth of the computer network to transmit to lighting-system controller 130. For example, sensor 141 may be a camera and further sensor 145 a microphone. In this way, it can be avoided most of the time that the high bandwidth sensing data of sensor 141 is transmitted, as most of the time only the further sensing data 145 is needed. Most of the time the preliminary activity classifier will not find a reason to obtain the sensing data from sensor 141.

For example, in an embodiment described above, sensor 145 is a microphone for detecting the sound of spraying. Processor circuit 133 is arranged to apply a preliminary activity filter to the further sensor data of sensor 145 to obtain a likelihood that the activity classifier will classify according to the activity of spraying graffiti when it is applied to the sensing data of sensor 141. If this likelihood exceeds a likelihood threshold, then the sensor 141 may be arranged to obtain the sensor data from the area illuminated by the light source 121.

For example, the sensors 141 and 145 may be a different type of sensor. For example, most of the detecting of graffiti may be made with fair certainty using the microphone data, but the camera may be used to obtain color changes during the act of applying graffiti.

In this way, processor circuit resources, e.g. computing power, processing speed may be optimized according to the likelihood that the activity classifier will classify within a particular activity classification of interest. In other words, resources of the processor circuit may be better assigned to a particular activity classification when the likelihood that an activity will be classified to that particular activity classification is above the likelihood threshold.

In an embodiment, the likelihood threshold is 50%, in another 60% or higher, etc.

Figure 3B:
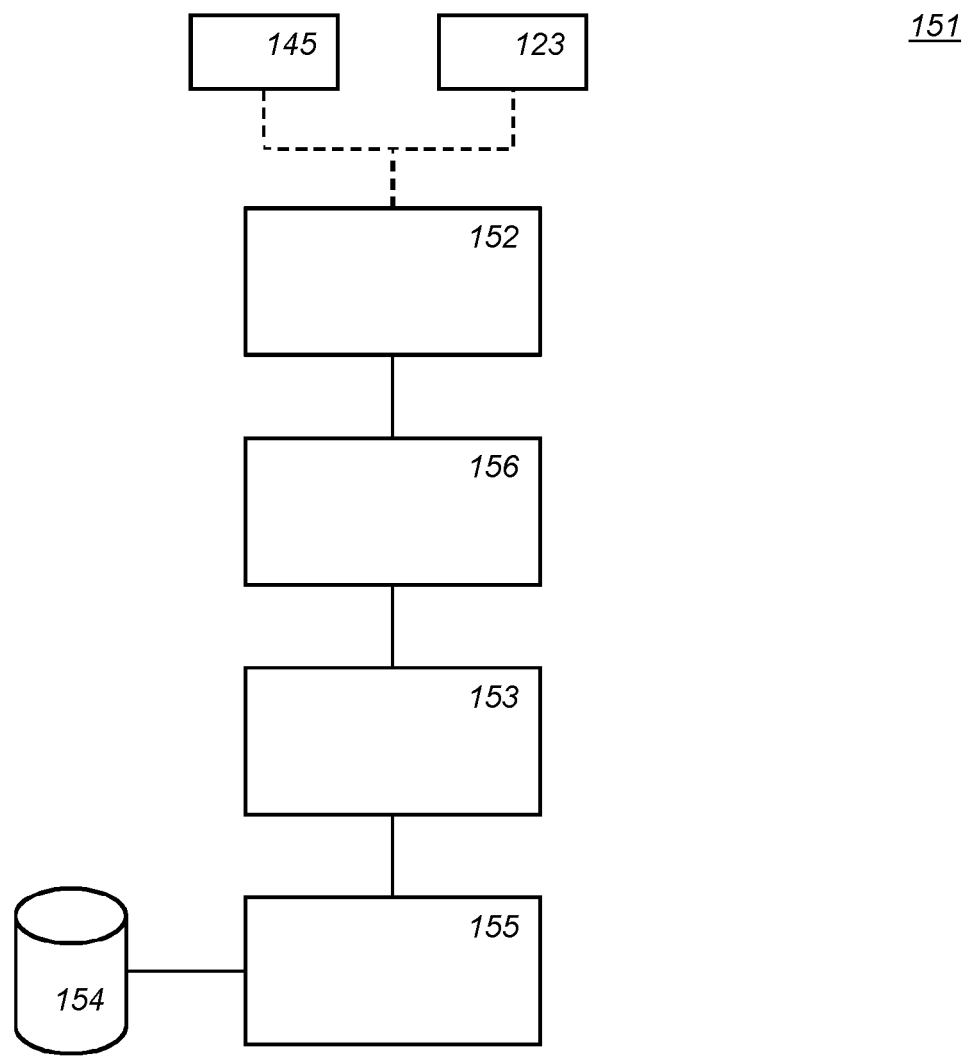

FIG. 3b schematically shows an example of an embodiment of a lighting-system control device 151. Lighting-system control device 151 differs from lighting-system control device 150 shown in FIG. 1b in that lighting-system control device 151 further comprises a preliminary activity filter 156.

For example, lighting-system control device 151 may communicate to the further sensor 145 via network communication unit 152 and network interface 123.

Preliminary activity filter 156 applies a filter to the further sensing data obtain a likelihood that activity classifier 153 will classify according to a particular activity classification. When this likelihood exceeds the likelihood threshold, a likelihood signal is sent to sensor 141 via the network communication unit 152. The likelihood signal triggers sensor 141 to obtain or to transmit its sensing data, for example a color change of the graffiti for the embodiment described above. The sensing data may be classified in the same activity classification as in the embodiment described with reference to FIG. 1a.

In an embodiment, the further sensing data may be related to a different activity classification than the activity to which the sensing data have been classified. For example, multiple activity classifications may be obtained for the same illuminated area. Lighting control data may be determined for multiple classifications. One or more lighting modules, for example communicatively coupled as in embodiment described above, in proximity of the illuminated may be programmed accordingly. For example, the further sensor 145 may be an alcohol sensor, and sensor 141 a camera.

Figure 3C:
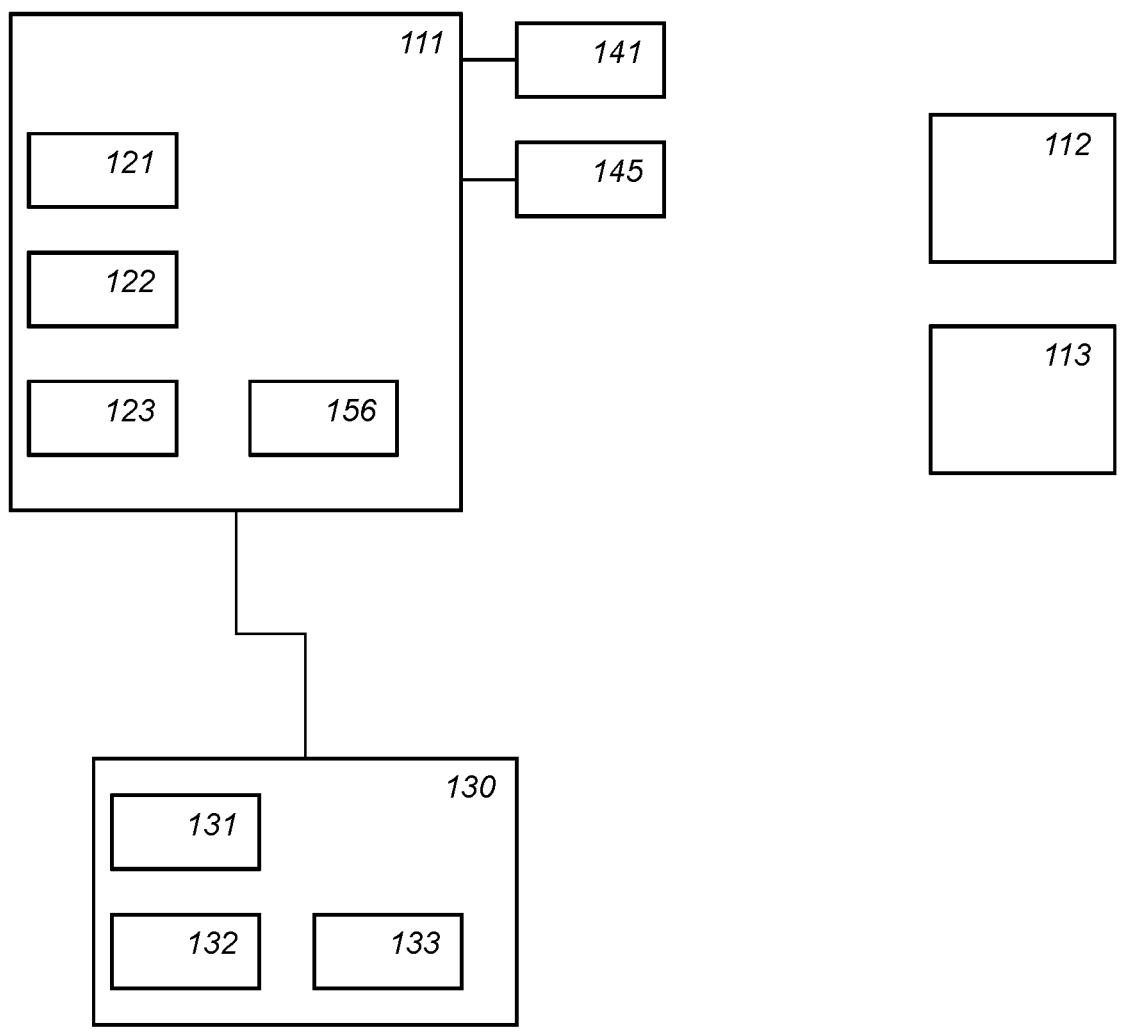

FIG. 3c schematically shows an example of an embodiment of a lighting-system system 103, wherein the preliminary filter is in the lighting module, lighting module deciding locally if sensing data should be sent to backend.

Lighting-system system 103 differs from lighting-system 102 in that lighting module 111 comprises a preliminary activity filter 156. In this embodiment lighting module 111 decides locally if sensor 141 should obtain further sensing data from the area illuminated by light source 121 and if said sensing data should be sent to lighting-system control device 130, via for example network interface 123. By pre-filtering for the activity locally only data is sent if detection of the activity is likely. In this embodiment, the preliminary activity filter 156 may also be applied to the sensing data, without using an additional sensor 145. For example, the preliminary activity filter 156 may detect if there is activity at all, and if so transmit the sensing data to lighting-system controller 130.

In an embodiment, preliminary activity filter 156 depends on a location of sensor 141 or further sensor 145. The location may be known to the installer of lighting module 111 or detected by sensor 141 or further sensor 145 via a location device or via a digital cellular network to which lighting module may be wirelessly or wired connected.

For example, if lighting module 111 is close to a wall, the likelihood that the activity classifier will classify the activity as applying graffiti is higher than the likelihood that the activity classifier will classify the activity as breaking glass. The image classifier may thus be trained on a subset of behaviors, thereby improving accuracy in the activity classification and optimizing resources in lighting system 103. By applying preliminary filter 156, activity classifier may be trained on a limited set of behaviors based on the likelihood that an activity classifier classifies for a particular activity classification. This will optimize resources in lighting system 103.

Figure 4A:
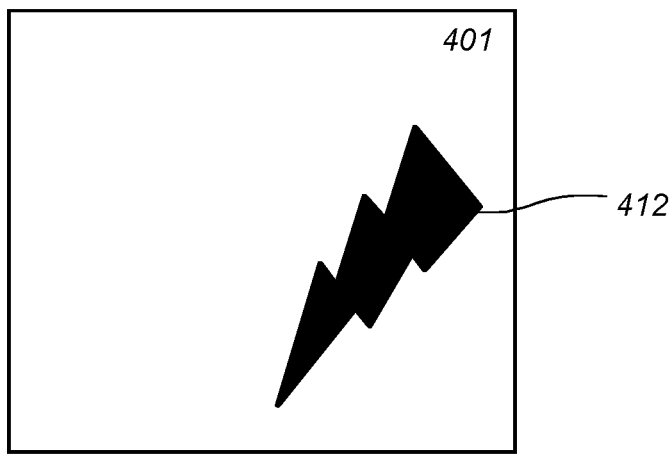
FIG. 4b schematically shows an example of graffiti with reduced contrast.
FIG. 4c schematically shows an example of an image comprising graffiti and a region of interest, FIG. 5a schematically shows an example of a street lighting system comprising one or more embodiments of a lighting-system, FIG. 5b schematically shows an example of a street lighting system wherein a location is marked, FIG. 6a schematically shows flow diagram for a lighting-system control method, FIG. 6b schematically shows flow diagram for a lighting-system control method, FIG. 7a schematically shows a computer readable medium having a writable part comprising a computer program according to an embodiment, FIG. 7b schematically shows a representation of a processor system according to an embodiment.

FIG. 4a schematically shows an example of an image 401 comprising a graffiti 412.

As said above the activity classifier may be configured to classify at least the act of spraying graffiti. To this purpose the sensor, e.g., a camera, (not shown in FIG. 4a) may be arranged to obtain sensing data comprising one or more images of the graffiti being sprayed. Obtaining the image data may be conditional upon detection a typical sound of spraying through a further sensor 145.

The sensor may, for example, comprise a camera and the sensing data comprise image data. The camera may be configured to obtain the image data, e.g. an image of the graffiti. The activity classifier may be applied to one or more images obtained by the camera. The processor circuit (not shown in FIG. 4a) may be configured to obtain an activity classification for the area interested by spraying graffiti.

Processor circuit 133 may be configured to determine a color from said image of the graffiti. The color of the graffiti may be determined from the image obtained by, for example, one of sensors 141, 142 or 143 of FIG. 1a or a further specific sensor for detecting colors. Spectrum of the light source of lighting module may be changed by lighting control data such that the area of interest is illuminated with the color determined in the image data, i.e. with the color of the graffiti, thereby reducing the contrast of the graffiti in the image.

Figure 4B:
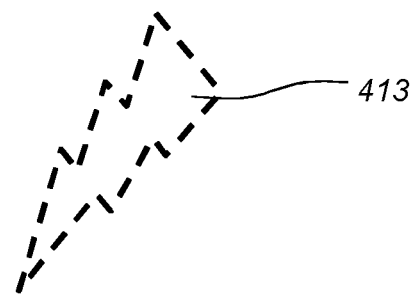

FIG. 4b schematically shows an example of a graffiti 413 with reduced contrast. In this example graffiti 413 is hardly visible because the area of interest is illuminated with the graffiti's color, putting graffiti 413 at the same chromatic level of the background, for example a surface of a wall, a window, a wagon, a street, etc.

In an embodiment, the color of graffiti may be detected in real time enabling the lighting-system control device to adapt in real-time the lighting control data to the color of the graffiti and reducing the contrast of the graffiti in the image.

The changed illumination has the effect of making the graffiti barely visible to the person creating them. This will disturb the person because he cannot properly see what he is spraying. As a result, the person will be discouraged from applying graffiti in areas where it is not allowed. This in turn will reduce the cleaning costs for the municipality or company responsible for cleaning the wall, the window, the wagon etc.

Figure 4C:
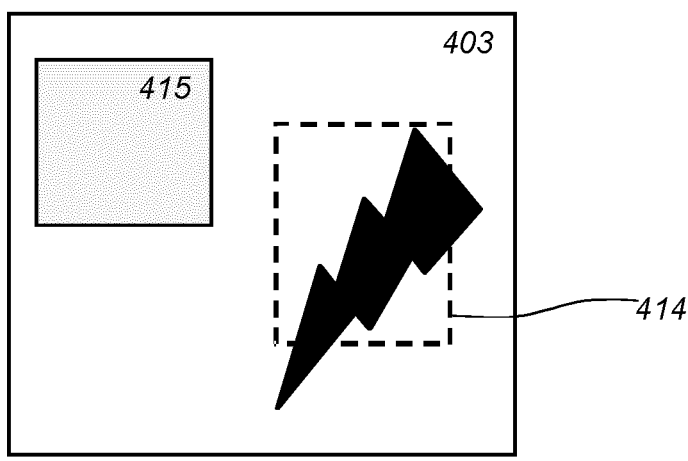

FIG. 4c schematically shows an example of an image comprising a graffiti and a region of interest 414.

In an embodiment, the activity classifier is configured to produce a region of interest in the image, for example region 414. The camera may be configured to obtain the image data, e.g. an image of the graffiti within region of interest 414. For example, graffiti may be recently applied to region of interest 414. The color may be determined from said region of interest 414. For example, color of the graffiti within region of interest 414 may be determined. The processor circuit (not shown in FIG. 4c) may thus limit the analysis, through an algorithm of image recognition or color recognition, to the region of interest 414 and not to an unrelated region 415 outside region of interest 414. Obtaining an area of interest in an image may be done may a suitably trained image classifier. For example, a deep neural network may be trained to identify in an image where certain objects are located. In this case the deep neural network may be trained to locate the location of graffiti. In an embodiment, processor circuit 133 determines an area of interest in graffiti that was recently applied, this may be obtained e.g., by comparing a recent image with a less recent image of the same location, and detecting locations where graffiti was added.

In this embodiment, both accuracy and speed of the analysis are increased enabling changing of the light spectrum as soon as the activity of spraying graffiti has been classified.

As described with reference to FIG. 4b, lighting control data may be determined to change the light spectrum of the light source illuminating the region of interest 414 to reduce contrast in the image containing the graffiti, for example by illuminating with a light of the same color of the graffiti.

In an embodiment, the processor circuit is configured to set the lighting control data to a default lighting control data for at least a default activity classification and to a further lighting control data different from the default lighting control data for a further activity classification. For example, if a default activity is detected, e.g., normal activity, or no activity, etc., the default lighting control data may be used, possibly modulated to account for the ambient light level, or for time of day, etc.

In an embodiment, the processor circuit is configured to, after changing the light spectrum, receive further sensing data, e.g., from the same sensor. In an embodiment, the sensor may continuously acquire sensing data. This further sensing data may comprise images, e.g. showing no more non-allowed acts in which case the desired effect is obtained.

In an embodiment, if the activity classifier which has been applied to the further sensing data corresponds to no activity classification or to a default activity classification, then new lighting control data may be determined corresponding to a default lighting control data. For example, the lighting module may be programmed to be in a default mode, for example the light source is programmed to illuminate the area with a default color and intensity.

In an embodiment, if the activity classifier which has been applied to the further sensing data corresponds to a further activity classification different from a default activity classification, then new lighting control data may be determined corresponding to a further lighting control data. For example, the lighting module is programmed to reduce contrast of an object (e.g. graffiti) in the image by for example tuning the color of the light source according to the color of the object.

However, if the activity classifier applied to the sensing data corresponds to a further activity classification which is not a desired activity classification, processor circuit may be configured to send an alarm signal. For example, if the light spectrum changed to discourage graffiti or drug use, e.g., through reduced contrast, but activity classifier finds that this activity has nonetheless continued, the system may escalate its response, e.g., by sending an alarm signal.

In an embodiment, the alarm signal may comprise a call to the police. In an embodiment, the alarm signal may comprise marking an area of interest where a particular activity has been classified with the light emitted by the light source. In an embodiment, where the area of interest is changing, the light source may track the area of interest, for example tracking the persons perpetrating the non-allowed act.

In an embodiment, the alarm signal may comprise increasing intensity of light emitted towards an area of interest where a particular activity has been classified. This may enhance chasing of the persons who are acting within the area of interest. In an embodiment, sending the alarm signal comprises transmitting further lighting control data to the lighting module to program said lighting module according to the further lighting control data. The further lighting control data may be arranged to mark the location of the area where the sensor obtained the sensing data. Marking the location illuminated area may include focus the light source to a specific point in the illuminated area, or changing the shape of the light source for obtaining one or more light beams.

Alternatively, if the first activity classification corresponds to one of the previously classified activities, then previously determined lighting control data may be continued to be used to program the lighting module.

In an embodiment, the processor circuit is configured to set the lighting control data to a first lighting control data for at least a first activity classification and to a different lighting control data for a second activity classification. For example, the first activity classification may be spraying graffiti and the second activity classification may be injecting drugs. In the first case lighting control data to reduce contrast of the graffiti may be used and in the second case lighting control data for increasing the blue-content in the light spectrum may be used.

Figure 5A:
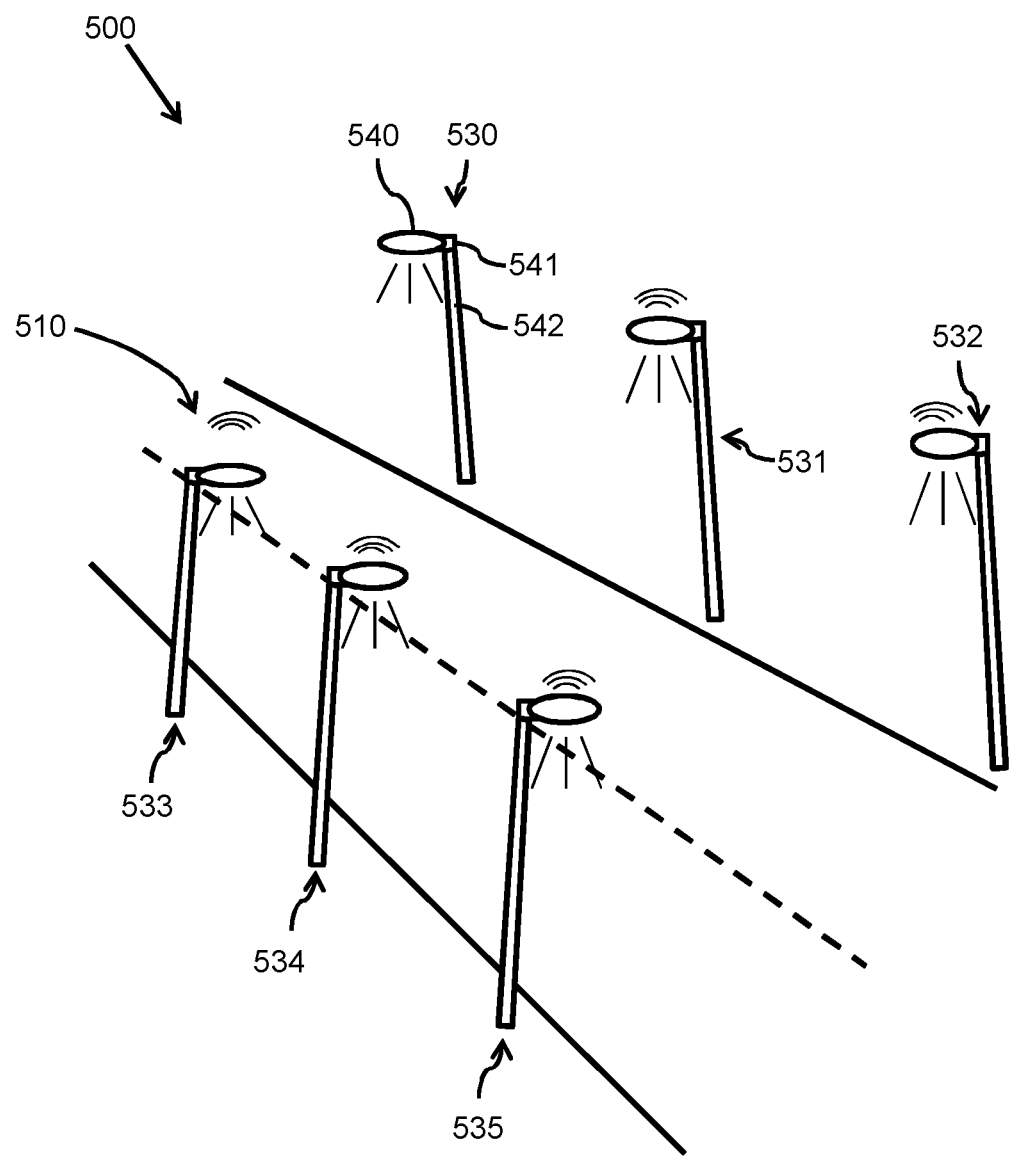

FIG. 5a schematically shows an example of a street lighting system 500 comprising one or more embodiments of a lighting-system.

FIG. 5a schematically shows a street 510 with a street lighting system 500 comprising one or more embodiments of a lighting-system for illuminating an environment. Along the street, there are lighting poles 530-535 which form the street lighting system 500. In this document, the term lighting pole refers to the pole itself together with the light fixture at the top of the pole and additional optional driving circuitries provided in the pole and/or in the light fixture at the top of the pole. For lighting pole 530 distinct elements have been indicated, namely the light fixture 540, a lighting pole 542 and a construction element 541 at the top of the pole which comprises, for example, a driving circuitry for driving the light source in the light fixture 540.

In an example, the lighting modules of lighting-system 100 described with reference to FIG. 1a comprise lighting poles 530-535. For example, the light source 121 of the lighting module 111 is provided in the light fixture 540 and is focused on the street below the lighting pole 530.

In an embodiment, described with reference to FIG. 4c, a portion of the street close to lighting pole 530 may be part of the area of interest where e.g. persons perpetrate non-allowed acts.

Other elements of the lighting-system 100 of FIG. 1, such the network interface 123, the programmable controller 122 of the lighting module 111 may, for example, be provided in the element 541 that also may comprise the driving circuitry of the light source. The lighting pole 530, light fixture 540 or element 541 may comprise also the lighting-system control device 130 of FIG. 2, including the receiver 131 for receiving the sensing data, the network interface 132 to communicate e.g. with other lighting poles and the processor circuit 133 configured to determine lighting control data to change the light spectrum of a specific light source in the light fixture 540.

In an embodiment, street lighting infrastructure or the city infrastructure, e.g. a lighting pole, is configured to obtain sensing data, e.g., including stay duration, via reflectance, infra-red, luminance sensing, image analysis, and other methods.

With reference to lighting-system 100 shown in FIG. 1a and light-system 102 shown in FIG. 3a, the network interfaces 123 of the lighting module 111 and network interface 132 of lighting-system control device 130 may be connected to a network via a wire or wireless connection for receiving and/or transmitting the lighting control data. The network interfaces 123 of the lighting module and network interface 132 of lighting-system control device 130 may comprise wired or wireless transmitters and/or wired or wireless receivers capable to receive and/or transmit the lighting control data via a suitable wired or wireless communication technology. The lighting pole 530, light fixture 540 or element 541 may comprise said wired or wireless transmitters and/or receivers. Examples of suitable wired or wireless communication technologies are but not limited to Ethernet, Bluetooth, Zig-Bee, Wi-Fi, Bluetooth Low Energy, mobile cellular technologies such as GSM, EDGE, LTE.

Lighting control data transmitted to one or more lighting poles 330-335 changes the light spectrum of the light source in the respective light fixture of the lighting pole.

As described in an earlier embodiment, if the activity classifier applied to the sensing data corresponds to a not desired activity classification, processor circuit in respective one or more lighting poles 330-335 may send an alarm signal.

Figure 5B:
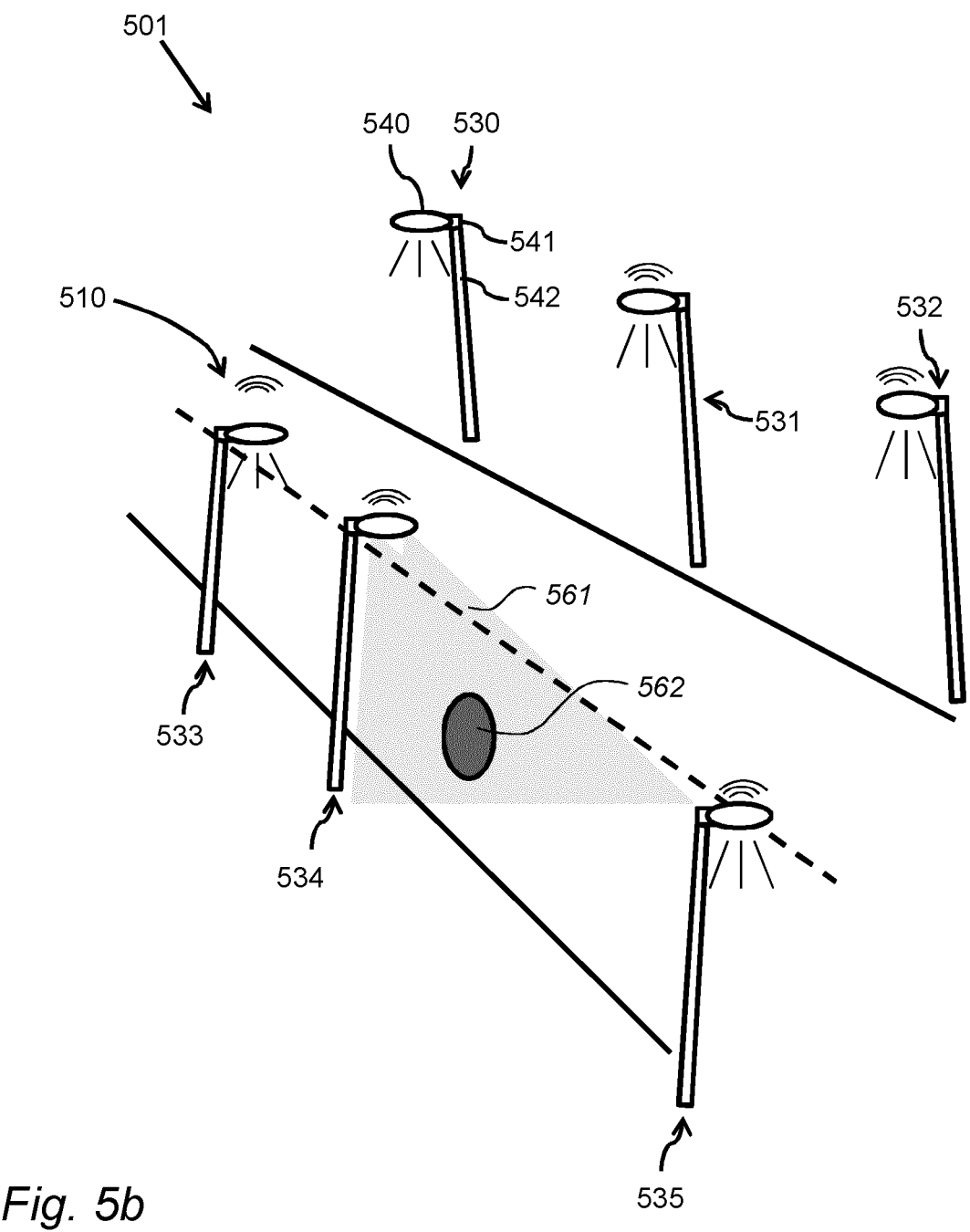

In an embodiment, shown with reference to FIG. 5b, the alarm signal 561 may mark a location of the area where the sensor obtained the sensing data. For example, an activity 562 has been classified at the area. In this embodiment sending the alarm signal may include transmitting further lighting control data to the lighting module, e.g. lighting pole 534, from, for example, a central lighting-control device, to program said lighting module, lighting pole 534 in this example, according to the further lighting control data. The further lighting control data is marking a location of the area where the sensor obtained the sensing data, e.g. where activity 562 has been classified.

If, for example, the activity classifier is configured to classify the act of injecting drugs, the processor circuit in one of the lighting poles 530-535, may be configured to determine lighting control data to change the light spectrum of the light sources of the lighting poles 530-535 for increasing the blue-light content in the light spectrum of said light sources.

The lighting control data is transmitted from one lighting-pole to other lighting-poles such that the programmable controllers of said other lighting-poles can control operation of the respective light sources and change the light spectrum of the respective light source.

Figure 6A:
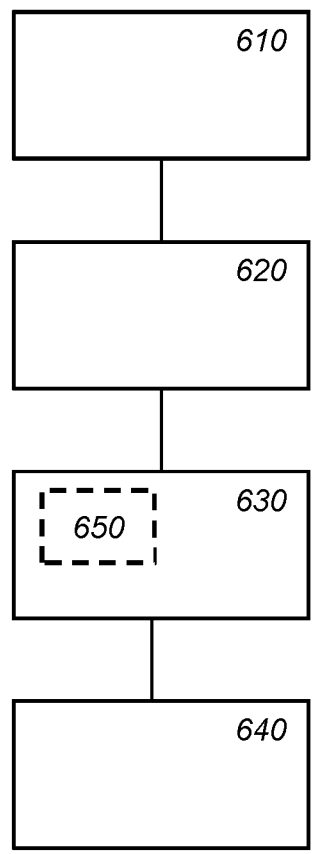

FIG. 6a schematically shows a flow diagram for a lighting-system control method 600. The lighting-system control method 600 is for illuminating an environment. The lighting-system control method comprises:
- obtaining 610 sensing data from an area illuminated by a light source,
- applying 620 an activity classifier to the sensing data to obtain an activity classification for the area,
- determining 630 lighting control data to change the light spectrum of the light source based on the activity classification, and
- transmitting 640 the lighting control data to the lighting module to program said lighting module according to the lighting control data.

Determining 630 the lighting control data may further comprise setting 650 the lighting control data to a default lighting control data for at least a default activity classification and to a first lighting control data different from the default lighting control data for a first activity classification.

Figure 6B:
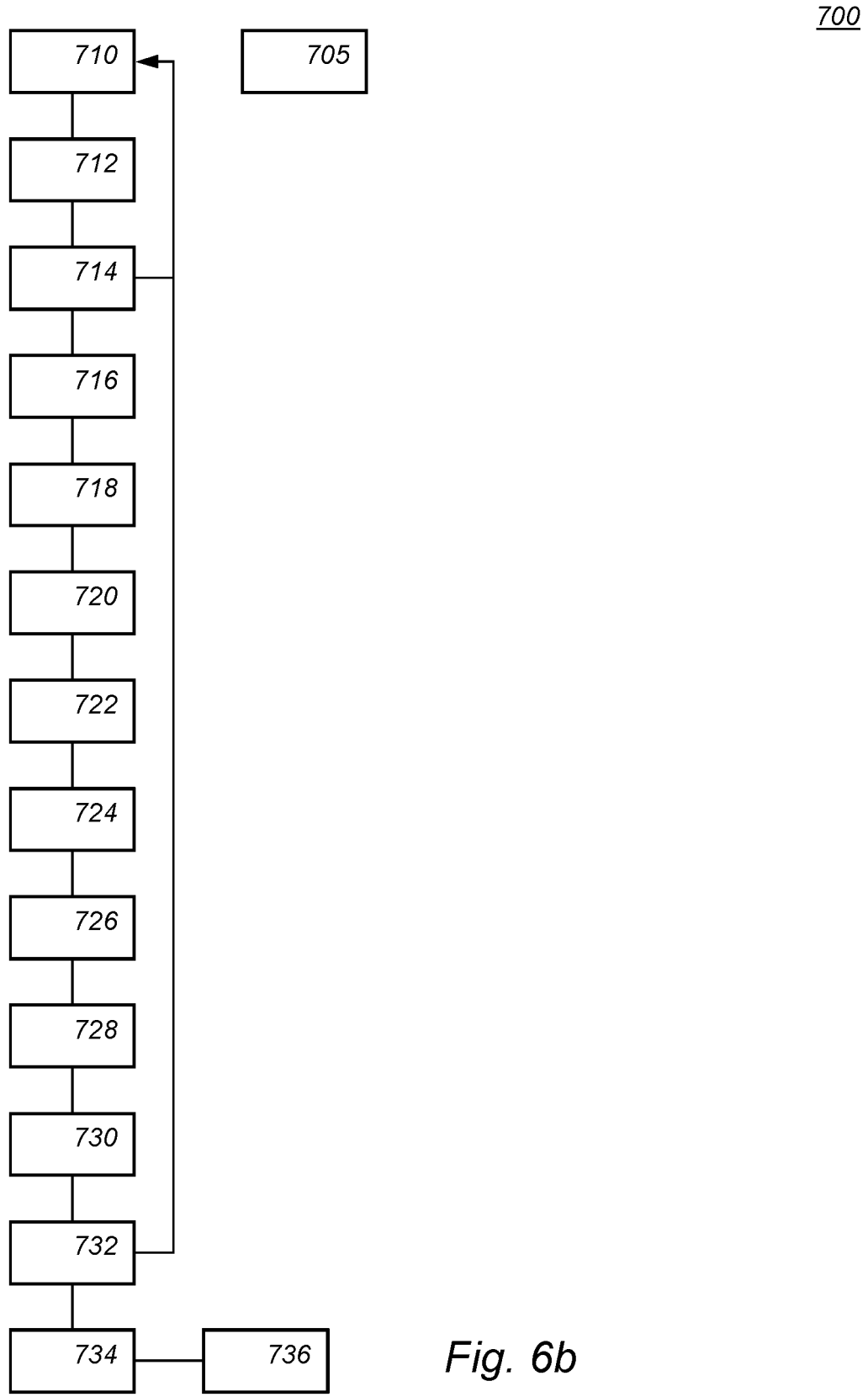

FIG. 6b schematically shows flow diagram for a lighting-system control method 700. The lighting-system control method 700 comprises transmitting 705 default lighting control data to the lighting module and further
- receiving 712 further sensing data from a further sensor associated with a lighting module, e.g., comprising a microphone
- apply 714 a preliminary activity filter to obtain a likelihood the activity classifier will classify according to a particular activity classification of interest, e.g., spraying graffiti,
- determine 714 if the likelihood is below a threshold, and if so return to step 710
- transmit 716 a command signal to the lighting module, requesting first sensing data,
- receiving 718 first sensing data from a sensor, e.g., comprising a camera
- apply 720 an activity classifier to the first sensing data to obtain an activity classification for the area, e.g., spraying graffiti,
- produce 722 a region of interest in the image,
- determine 724 first lighting control data to change the light spectrum of the light source based on the activity classification, e.g., determine a color from the region of interest in the image,
- transmit 726 the first lighting control data to the lighting module to program said lighting module according to the first lighting control data,
- receive 728 second sensing data from the sensor,
- apply 730 an activity classifier to the second sensing data to obtain a second activity classification for the area,
- determine 732 if the second activity classification is not a desired activity classification then send 734 an alarm signal, otherwise return to step 710,
- for example, sending the alarm signal may comprise, transmit 736 second lighting control data to the lighting module to program said lighting module according to the second lighting control data, the second lighting control data marking the location where the area where the sensor obtained the sensing data. Sending the alarm signal may comprise sending a signal to the police.

In the various embodiments, the input interface may be selected from various alternatives. For example, input interface may be a network interface to a local or wide area network, e.g., the Internet, a storage interface to an internal or external data storage, a keyboard, etc.

Typically, the lighting modules 111-113, lighting-system control device 130 each comprise a microprocessor (not separately shown) which executes appropriate software stored at the device; for example, that software may have been downloaded and/or stored in a corresponding memory, e.g., a volatile memory such as RAM or a non-volatile memory such as Flash (not separately shown). The device 111-113, 130 may also be equipped with microprocessors and memories (not separately shown). Alternatively, the devices may, in whole or in part, be implemented in programmable logic, e.g., as field-programmable gate array (FPGA), or they may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Many different ways of executing the method 600 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 620, and 630 may be executed, at least partially, in parallel. Moreover, a given step may not have finished completely before a next step is started.

A method according to the invention may be executed using software, which comprises instructions for causing a processor system to perform method 600 or method 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

FIG. 7a shows a computer readable medium 1000 having a writable part 1010 comprising a computer program 1020, the computer program 1020 comprising instructions for causing a processor system to perform a method lighting-system control method 600 or 700 according to an embodiment described with reference to FIG. 6a or FIG. 6b. The computer program 1020 may be embodied on the computer readable medium 1000 as physical marks or by means of magnetization of the computer readable medium 1000.

However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said lighting-system control method 600 or 700.

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the lighting-system control device 130 may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A lighting system for illuminating an environment, the lighting system comprising:
    a lighting module, the lighting module comprising:
        a light source for emitting light, and
        a programmable controller configured to control an operation of the light source, a light spectrum of the light source being controllable by the programmable controller;
    a sensor arranged to obtain sensing data from an area illuminated by the light source; and
    a lighting system control device comprising a processor circuit configured to receive the sensing data,
        apply an activity classifier to the sensing data to obtain an activity classification for an activity in the area,
        determine lighting control data that causes the light spectrum of the light source to change based on the activity classification,
        transmit the lighting control data to the lighting module such that said lighting module is programmed according to the lighting control data, and
        set the lighting control data to a default lighting control data and to a further lighting control data different from the default lighting control data upon obtaining activity classification corresponding to the further lighting control data,
    wherein the changed light spectrum reduces contrast of an object important to the activity.

2. The lighting system of claim 1, wherein the activity is a physical activity of a human being, the physical activity at least partly taking place in the area illuminated by the light source.

3. The lighting system of claim 1, wherein the sensor comprises a camera, and the sensing data comprises image data, the activity classifier being applied to one or more images obtained from the camera, and wherein the changed light spectrum reduces contrast of an object in the image.

4. The lighting system of claim 3, wherein the processor circuit is configured to determine a color from the image data, and the lighting control data is determined to change the light spectrum to the color determined in the image data.

5. The lighting system of claim 3, wherein the activity classifier is configured to produce a region of interest in the image, the color from the image data being determined from the region of interest.

6. The lighting system of claim 1, wherein the activity classifier is configured to classify at least an act of spraying graffiti, and wherein the reducing the contrast reduces contrast of the graffiti.

7. The lighting system of claim 1, wherein the processor circuit is configured to:
    after changing the light spectrum, receive further sensing data,
    apply an activity classifier to the further sensing data to obtain a further activity classification for the area, and
    if the further activity classification is not a desired activity classification, send an alarm signal.

8. The lighting system of claim 7, wherein the processor circuit is configured to send the alarm by:
    transmitting further lighting control data to the lighting module to program said lighting module according to the further lighting control data, the further lighting control data marking a location of the area where the sensor obtained the sensing data.

9. The lighting system of claim 1, wherein the object is a vein, and wherein the activity classifier is configured to classify at least an act of injecting drugs, the lighting control data being arranged to increase the blue-content in the spectrum such that the vein is less visible.

10. The lighting system of claim 1, wherein the sensing data is first sensing data and wherein the lighting system further comprises a further sensor arranged to obtain further sensing data from the area illuminated by the light source, the processor circuit being arranged to apply a preliminary activity filter to the further sensing data to obtain a likelihood that the activity classifier will classify the sensing data according to a particular activity classification of interest, wherein the processor circuit is configured to obtain the first sensing data if the likelihood exceeds a likelihood threshold.

11. The lighting system of claim 10, wherein the further sensor is a microphone.

12. The lighting system of claim 1, wherein
the lighting module, the sensor and the lighting system control device are integrated in a single device, or
the lighting module comprises a network interface configured to allow the lighting module to communicate via a network, and the lighting system control device comprises a network interface configured to allow the lighting system control device to communicate with the lighting module via the network.

13. The lighting system of claim 1, wherein the activity affects the object.

14. The lighting system of claim 13, wherein the reducing the contrast of the object hinders execution of the activity.

15. A lighting system control method for illuminating an environment, the lighting system control method comprising:

obtaining sensing data from an area illuminated by a light source;
applying an activity classifier to the sensing data to obtain an activity classification for an activity in the area;
determining lighting control data that causes a light spectrum of the light source to change based on the activity classification, the changed light spectrum reducing contrast of an object important to the activity;
transmitting the lighting control data to a lighting module including the light source to program said lighting module according to the lighting control data; and
setting lighting control data to a default lighting control data and to a further lighting control data different from the default lighting control data upon obtaining activity classification corresponding to the further lighting control data.

16. A non-transitory computer readable medium comprising instructions configured to cause a processor to perform the method of claim 15 when the processor executes the instructions.

17. The lighting system control method of claim 15, wherein the activity affects the object.

18. The lighting system control method of claim 17, wherein the reducing the contrast of the object hinders execution of the activity.

* * * * *